United States Patent Office 3,344,625
Patented Oct. 3, 1967

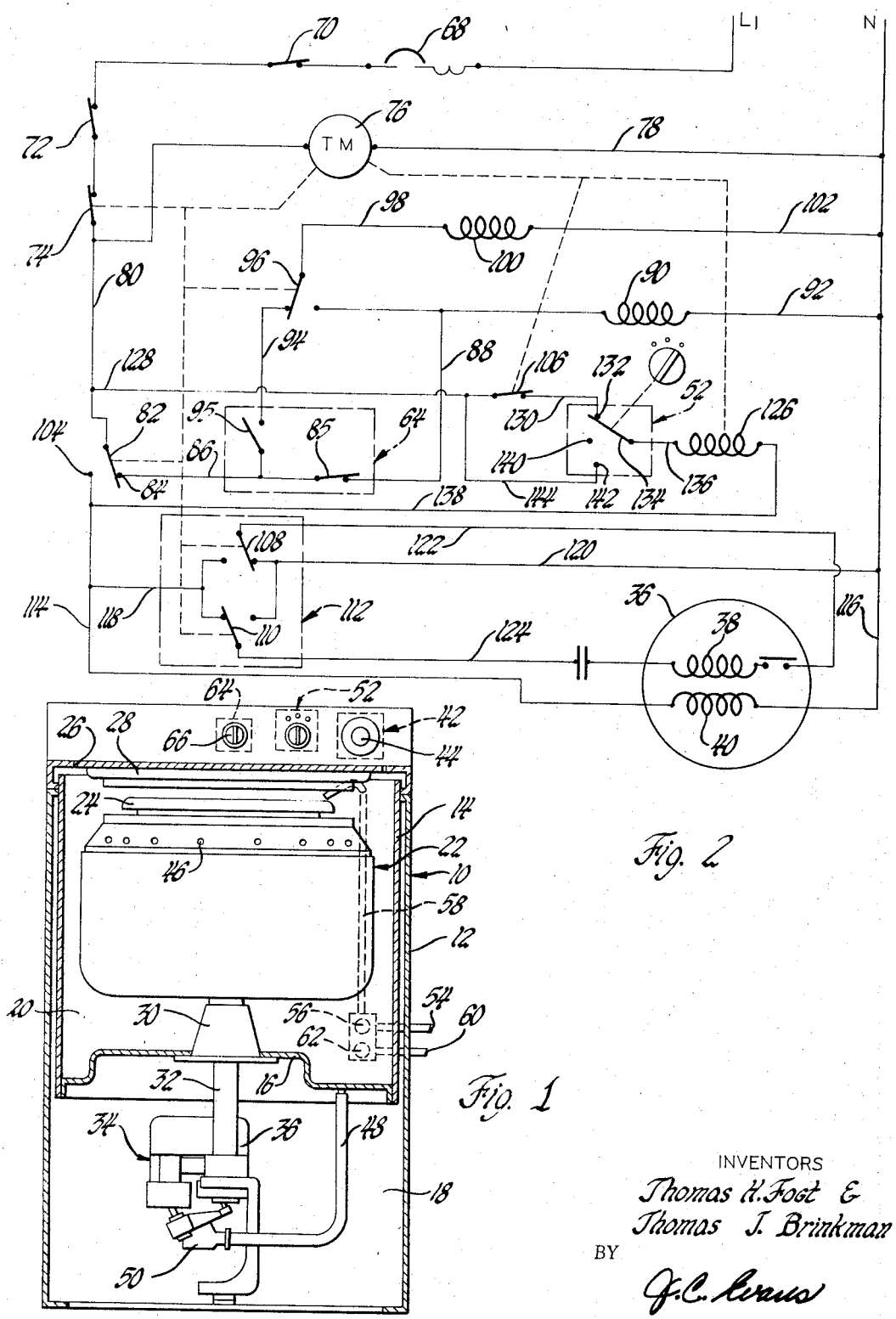

3,344,625
PLURAL LEVEL FILL SYSTEM FOR
WASHER APPARATUS
Thomas H. Fogt, West Carrollton, and Thomas J. Brinkman, Dayton, Ohio, assignors to General Motors Corporation, Detroit, Mich., a corporation of Delaware
Filed Sept. 20, 1966, Ser. No. 580,724
4 Claims. (Cl. 68—12)

This invention is directed to a washer fill control system and more particularly to a washer control system including a timer and water level selector switch system for obtaining three separate and distinct amounts of fill water in an automatic domestic clothes washer appliance.

Various fill control systems have been proposed for regulating the amount of water directed into the water container of a domestic washer appliance during a predetermined fill cycle of operation therein.

Such systems are desirable since they enable the user of a washer to closely control the amount of water used during the wash cycle of operation in accordance with the size of the load being processed whereby the user can economize water usage and furthermore can reduce the total amount of washing time by terminating the fill cycle when a proper amount of water has been directed into the apparatus preparatory to the washing and other sequentially controlled cycles of machine operation.

These systems, however, generally require rather elaborate sensing systems and the like to obtain any appreciable variation in the water fill amounts.

Accordingly, an object of the present invention is to provide a simplified washer control including a cycle determining timer mechanism having first timer control switch means for terminating a fill cycle of operation and second timer control switch means operatively associated with water level selector switch means for periodically energizing timer speed solenoid means during the fill cycle so as to vary the rate of advance of the timer mechanism to vary the duration of the fill period as determined by the first timer control switch means thereby obtaining plural water levels in the water container of a domestic appliance following the fill cycle of operation.

Still another object of the present invention is to improve the operation of a domenstic washer by the provision therein of a fill control including a cycle controlling timer mechanism having a drive controlled timer speed solenoid for first and second speeds of operation and wherein the timer mechanism includes first timer controlled switch means operated by the timer motor to establish the duration of a fill period and wherein the timer mechanism includes second timer controlled switch means associated with water level selector switch means for controlling energization of the timer speed solenoid means during the fill cycle of operation so as to vary the duration of the fill period and the water level in a water container of the appliance.

Yet another object of the present invention is to provide a system of the type set forth in the preceding object wherein the water level selector switch is a plural position controller having a first operative position in which the timer speed solenoid is maintained energized independently of the second timer controlled switch means; a second control position wherein the timer speed solenoid is maintained deenergized during the fill cycle; and a third position wherein the timer speed solenoid is maintained energized during a part of the fill cycle under the control of the second timer control switch means.

Further objects and advantages of the present invention will be apparent from the following description, reference being had to the accompanying drawings wherein a preferred embodiment of the present invention is clearly shown.

In the drawings:

FIGURE 1 is a view in vertical section of a domestic washer including the present invention; and FIGURE 2 is a diagrammatic electrical circuit including the improved water level controller of the present invention.

Referring now to FIGURE 1, a domestic clothes washer 10 is illustrated including an outer casing 12 that encloses a water container 14 having a bottom bulkhead 16 below which is located a machinery compartment 18 and above which is located a water collecting space 20.

Within the water container 14 is located a rotatable spin tub 22 which has an upper opening 24 therein aligned with an opening 26 in the top of the casing 12 closed by a door 28. When the door 28 is opened, articles can be loaded into the tub 22 through the top opening 24 prior to a washing cycle of operation.

In the illustrated arrangement, the spin tub 22 is rotatably supported by means including a resilient hat 30 on the bottom bulkhead 16. Depending from the hat 30 is a shaft housing 32 of a drive mechanism 34 of the type more specifically set forth in United States Patent No. 3,087,321, issued Apr. 30, 1963, to Brucken.

The drive mechanism 34 includes a reversible electrically energizable induction motor 36 having a phase or start winding 38 and a main or run winding 40.

Additionally, in the illustrated system, the motor 36 is maintained under the control of a timer mechanism 42 including a rotatable cycle selecting dial 44 located on a rear control panel of the outer casing 12. During a normal sequence of operation, the timer mechanism 42 is operative sequentially for carrying out a wash cycle of operation including a predetermined fill phase, a wash phase, a subsequent rinse phase, and a final spin dry phase of operation wherein the tub 22 is rotated at a high speed of operation so as to extract water therefrom through ports 46 in the upper periphery thereof into the water collecting space 20 from whence water is drained through a conduit 48 connected to an outlet fitting in the bottom bulkhead 16 to the inlet of a drain pump 50 having its outlet end (not shown) connected to a drain exteriorly of the outer casing 12.

A representative wash cycle of operation will depend upon the characteristics of the timer mechanism 42 but for purposes of the present invention particular attention is directed to a water level selector switch 52 and the manner that it is functionally related to timer mechanism 42 so as to produce three distinct water levels in the tub 22 following an initial fill phase and as preselected by the user of the machine.

More particularly, during an initial fill cycle of operation, water is directed from a hot water supply conduit 54 through a solenoid actuated hot water valve 56 thence through an inlet conduit 58 through the top opening 24 and thence interiorly of the spin tub 22. Cold water is supplied through a conduit 60 thence through an electrically energizable solenoid actuated cold water valve 62 connected through the inlet conduit 58 for passage into the tube 22.

In the illustrated arrangement, on the control panel is located a temperature selector switch 64 that is operative upon rotation of a dial 66 to control the temperature of the water supply.

In the illustrated arrangement, once articles have been loaded into the tub 22 and the lid or door 28 is closed, the machine can be conditioned for a wash cycle of operation by positioning the control dial 44 at the beginning of a wash cycle of operation. As best seen in FIGURE 2, this completes a fill energization circuit from wire $L_1$ through an overload switch 68 responsive to a high temperature condition of operation of the motor 36 and operative to deenergize the motor 36 upon sensing such a condition so as to prevent damage thereto. The fill energization circuit thence is completed through a lid switch 70 that is closed by the door 28; thence through a push-pull switch 72 operated into a closed operation by pushing the dial 44 of controller 42 in a predetermined direction; thence through a timer controlled switch 74 that controls energization of a timer motor 76 included in a conductor 78 between the switch 74 and wire N of the power source.

From switch 74 the fill energization circuit runs through a conductor 80 thence through another timer controlled switch 82 that, during the fill phase of operation engages a contact 84 connected by a conductor 86 to the water temperature selector 64. The selector 64 includes a switch 85 which is connected by a conductor 88 to one side of a coil 90 controlling the hot water solenoid operated valve 56. The opposite side of the coil 90 is connected by a conductor 92 to wire N of the power source. In the illustrated arrangement the water temperature selector 64 also includes a switch 95 that is shown open and the water supply is thereby conditioned for only a hot fill. If it is desired to obtain a warm fill the switch 95 is closed to complete a circuit through conductor 94 thence through a single pole, double throw timer controlled switch 96 that is in turn electrically connected by conductor 98 to one side of a coil 100 for controlling operation of the solenoid controlled cold water valve 62. The opposite side of the coil 100 is connected by conductor 102 to wire N. In accordance with certain principles of the present invention, the timer motor 76 is operatively connected through suitable shaft and cam means (not shown) to open switch 74 following a complete washing cycle of operation; to move the switch blade 82 from contact 84 into electrical engagement with a motor run contact 104 following a fill phase of operation; and to control a third water level control switch 106 in a manner to be discussed.

Additionally, the timer motor 76 will periodically operate switch blades 108, 110 in a motor reversing switch assembly 112 for changing the polarity across the phase winding 38 of the motor 36 following periods when the motor 36 has been stopped thereby to reverse the operation of the motor 36 so as to carry out predetermined phases of the cycle of operation as more specifically set forth in the above mentioned Brucken patent.

For purposes of the present invention, it is merely necessary to note that the motor run contact 104 is electrically connected by conductor 114 to one side of the run winding 40 which has the opposite side thereof connected by conductor 116 to wire N and that the reversing switch 112 hase one side thereof connected by conductor 118 to conductor 114 and the opposite side thereof connected to conductor 120 to wire N. A conductor 122 electrically connects the movable switch blade 108 to one side of the phase winding 38 and a conductor 124 electrically connects the movable switch blade 110 to the opposite side of the phase winding 38 whereby the switch blades 108, 110 are movable by the timer mechanism to selectively connect to either the conductors 118, 120 and thereby serve to reverse the polarity across the phase winding 38.

With more particular reference to the fill phase of operation it is necessary to point out that the timer mechanism 42 is of the type set forth more specifically in United States Patent No. 2,870,834, issued Jan. 27, 1959, to Sisson. Thus the fill energization circuit includes a timer speed solenoid 126 that when energized will condition suitable gear means within the timer mechanism 42 to cause the timer to advance at a high and a low speed. In the illustrated arrangement, when the solenoid 126 is energized, the timer will advance through a predetermined rotative movement during a one-half minute period and when the solenoid is deenergized, the timer mechanism will advance through the same rotative movement during a one minute period.

It will be noted that the water level selector 52 includes three positions. When the dial of the water selector 52 is in a regular fill position, the timer speed solenoid 126 is included in a circuit from wire $L_1$ through overload switch 68, lid switch 70, push-pull switch 72, timer controlled switch 74, thence through conductor 80, a conductor 128 that is electrically connected to the timer controlled level determining switch 106 which in turn is electrically connected by conductor 130 to a regular water level contact 132 that is in electrical engagement with a single pole, plural throw switch blade 134 of water level selector 52. The switch blade 134 is electrically connected to one side of solenoid 126 which has the opposite side thereof electrically connected by conductor 138 to conductor 114 thence through the main motor winding 40 and conductor 116 to wire N. The timer speed solenoid 126 has a high impedance that will maintain the motor 36 deenergized; yet sufficient current will flow through the above-described circuit to condition the timer mechanism 42 for its faster operation. In the illustrated arrangement, following three timer advances, suitable cam means (not shown) operate the water level switch 106 into its opened position thereby deenergizing the timer speed solenoid 126 whereby the timer mechanism 42 advances at its slower rate for the remainder of a fill phase of operation following which time the timer controlled switch blade 82 moves from the fill contact 84 to the motor run contact 104 thereby shorting-out the level selector 52 and speed solenoid 126 so that the time mechanism 42 will advance at the slower rate for the remainder of its wash cycle controlling operation. During the regular fill operation, by virtue of a speeded-up timer mechanism operation during the first three increments of the timer advance and a slower timer mechanism operation during the remaining three increments of timer advance, the resultant fill period, in one working embodiment, is four and one-half minutes resulting in a water fill to the spin tub 22 of thirteen and one-half gallons of water.

A user can also select a large water fill wherein the movable switch blade 134 of selector 52 is positioned to an index point 140 thereby disconnecting the timer speed solenoid 126 during the fill phase of operation. Accordingly, the timer mechanism 42 will operate at its lower speed so that in a six increment fill phase, the filll duration will constitute a six minute period during which time eighteen gallons of water will flow into the tub 22.

If desired, the user can also select a small fill by moving the switch blade 134 into electrical engagement with a contact 142.

At this position, the timer speed solenoid energization circuit is bypassed about the water level switch 106 by a conductor 144 electrically connected to the contact 142. Thus, at the small position, the timer mechanism will operate at its faster speed through its six increment fill phase advance and the fill duration thereby will be reduced in one working embodiment to three minutes resulting in a nine gallon fill of tub 22.

Following the fill phase, the timer will always position the movable switch blade 82 into engagement with the motor run contact 104 so as to short-out the level selector and speed solenoid during the remainder of the timer controlled washing operation sequence.

By virtue of the above-described system, a number of fill quantities can be easily selected by the user of a washing machine and the possible selections are obtained merely by modifying a standard timer mechanism without the need for elaborate sensing mechanisms or systems in the washer.

While the embodiment of the present inventon as herein disclosed constitutes a preferred form it is to be understood that other forms might be adopted.

What is claimed is as follows:

1. In a clothes washing apparatus, a water container, means for directing fluid to said container including electrically energizable fluid supply means, means for energizing said fluid supply means including first timer controlled switch means, means including an electrically energizable timer motor for conditioning said first timer controlled switch means to deactivate said electrically energizable fluid supply means following a fill operation, means for varying the output speed of said timer motor including speed solenoid means, circuit means for energizing said speed solenoid means during a predetermined fill operation including a water level selector, said first timer controlled switch means and second timer controlled switch means, said second timer controlled switch means being bypassed when said selector switch is in a first position whereby said timer speed solenoid is energized under the control of said first timer controlled switch means to operate said timer motor at its higher output speed and to terminate the fill operation following a first predetermined period of time, said water level selector being positionable at a second position so as to maintain said timer speed solenoid deenergized during the fill operation and said timer motor operative at its low speed output to produce longer filling time terminated by operation of said first timer controlled switch means, said water level selector switch having a third position wherein said timer speed solenoid means is energized during the fill operation by said second timer controlled switch means that is operated by said timer motor following a first predetermined period of said fill operation to deenergize said timer speed solenoid whereby said timer motor advances at its lower output speed during the remainder of the fill operation to produce an intermediate fill time terminated by said first timer controlled switch means.

2. In the combination of claim 1, said first timer controlled switch means being operative to a first position to shunt said timer speed solenoid means at the end of each fill operation.

3. In the combination of claim 2, a washer drive motor, second circuit means for energizing said drive motor including said first timer controlled switch means when in its first position, said first timer controlled means having a second operative position for energizing said fluid supply means and for deenergizing said motor.

4. In the combination of claim 3, said circuit means for energizing said speed solenoid means including said washer drive motor.

References Cited

UNITED STATES PATENTS

| | | | |
|---|---|---|---|
| 2,608,252 | 8/1952 | Candor | 68—12 X |
| 2,747,395 | 5/1956 | Candor | 68—12 |
| 2,896,436 | 7/1959 | Buechler | 68—12 |
| 3,301,022 | 1/1967 | Low | 68—207 X |

WILLIAM I. PRICE, *Primary Examiner.*